(12) United States Patent
Kwasny et al.

(10) Patent No.: US 7,907,160 B2
(45) Date of Patent: Mar. 15, 2011

(54) TRACK LABELING ON A MEDIUM

(75) Inventors: David Michael Kwasny, Corvallis, OR (US); Paul James McClellan, Bend, OR (US); Mixall Salko, Hull (CA)

(73) Assignee: Hewlett-Packard Development Company, L.P., Houston, TX (US)

( * ) Notice: Subject to any disclaimer, the term of this patent is extended or adjusted under 35 U.S.C. 154(b) by 1037 days.

(21) Appl. No.: 10/898,392

(22) Filed: Jul. 23, 2004

(65) Prior Publication Data

US 2006/0017754 A1 Jan. 26, 2006

(51) Int. Cl.
*B41J 2/47* (2006.01)
(52) U.S. Cl. .............................. 347/225; 347/224; 347/5
(58) Field of Classification Search ............... 369/275.3; 347/225, 2, 5, 3, 9, 19, 224
See application file for complete search history.

(56) References Cited

U.S. PATENT DOCUMENTS

| | | | |
|---|---|---|---|
| 4,967,286 A | 10/1990 | Nomula et al. | |
| 5,317,337 A | 5/1994 | Ewaldt | |
| 5,518,325 A | 5/1996 | Kahle | |
| 5,781,221 A | 7/1998 | Wen et al. | |
| 5,844,865 A | 12/1998 | Bakx | |
| 6,019,151 A | 2/2000 | Wen et al. | |
| 6,264,295 B1 | 7/2001 | Bradshaw et al. | |
| 6,270,176 B1 | 8/2001 | Kahle | |
| 6,404,582 B1 | 6/2002 | Rodrigues de Miranda | |
| 6,507,557 B1 * | 1/2003 | Ohno et al. | 369/275.3 |
| 2002/0105867 A1 | 8/2002 | Tamaru et al. | |
| 2002/0191517 A1 * | 12/2002 | Honda et al. | 369/53.29 |
| 2003/0108708 A1 | 6/2003 | Anderson et al. | |
| 2003/0193542 A1 * | 10/2003 | Kasahara | 347/37 |
| 2004/0114500 A1 | 6/2004 | McClellan | |

FOREIGN PATENT DOCUMENTS

JP 2000306339 11/2000

OTHER PUBLICATIONS

U.S. Appl. No. 10/423,366, unpublished, McClellan et al.
PCT/US2004/029097, Search Report, Mar. 29, 2005, Hewlett-Packard.

* cited by examiner

*Primary Examiner* — Lam S Nguyen (57) ABSTRACT

A method for labeling a plurality of tracks on a medium is disclosed. The method detects one or more contiguous blank pixels at the conclusion of a data set representing a first track. An ending position for the first track is set at a last non-blank pixel. At least a portion of the first track up to the ending position is labeled before advancing to a second track.

80 Claims, 8 Drawing Sheets

TRACK LABELING ON A MEDIUM

BACKGROUND

Labels are used on optical media, such as compact discs (CDs) and digital versatile discs (DVDs), typically to provide human-readable indicia of data content recorded on the media, artwork, and the like. Such labels may be prepared on a separate medium such as adhesive-backed paper suitable for affixing to an optical disc, or may be marked directly upon a surface of the optical medium.

Screen printing methods have conventionally been used to label surfaces of optical discs; however, preparation of a stencil for screen printing is an elaborate, time-consuming and expensive process, rendering the method cost-ineffective for labeling single discs or a relatively small number of discs.

Conventional printer mechanisms, such as off-the-shelf inkjet printers, are typically optimized for sheets of paper and are typically based on Cartesian coordinates, producing lines, strips, or rectangles of coverage. Special-purpose printers, incorporating a tray for holding a CD/DVD, may use conventional inkjet technology to print directly on the label side of an optical disc, but such printers are fairly expensive and bulky.

In a conventional CD/DVD drive, a motor rotates an optical disc relative to a conventional optical marking mechanism, such as a laser. Recent advances allow a laser to also be used as the marking mechanism, where labeling or marking is accomplished by generating a beam for optically marking a surface of the medium. When a conventional marking mechanism is used to mark a plurality of concentric circular tracks on an optical disc, such as a CD or DVD, a length of time is needed to reposition and stabilize the marking mechanism when advancing between tracks. Meanwhile, the disc may be constantly rotating. Conventionally, starting positions for each track are aligned together on a radial line. However, by the time the marking mechanism has completed marking all the pixels of a track and has advanced to a next track and become stabilized, the disc will have rotated past the next starting position. Before writing can commence at the next starting position, a waiting period will be required for the disc to complete a revolution, such that the mechanism is positioned at the starting position for the next track. This waiting period increases the overall time required for the marking mechanism to write a complete set of track data.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION

Figure 1A:
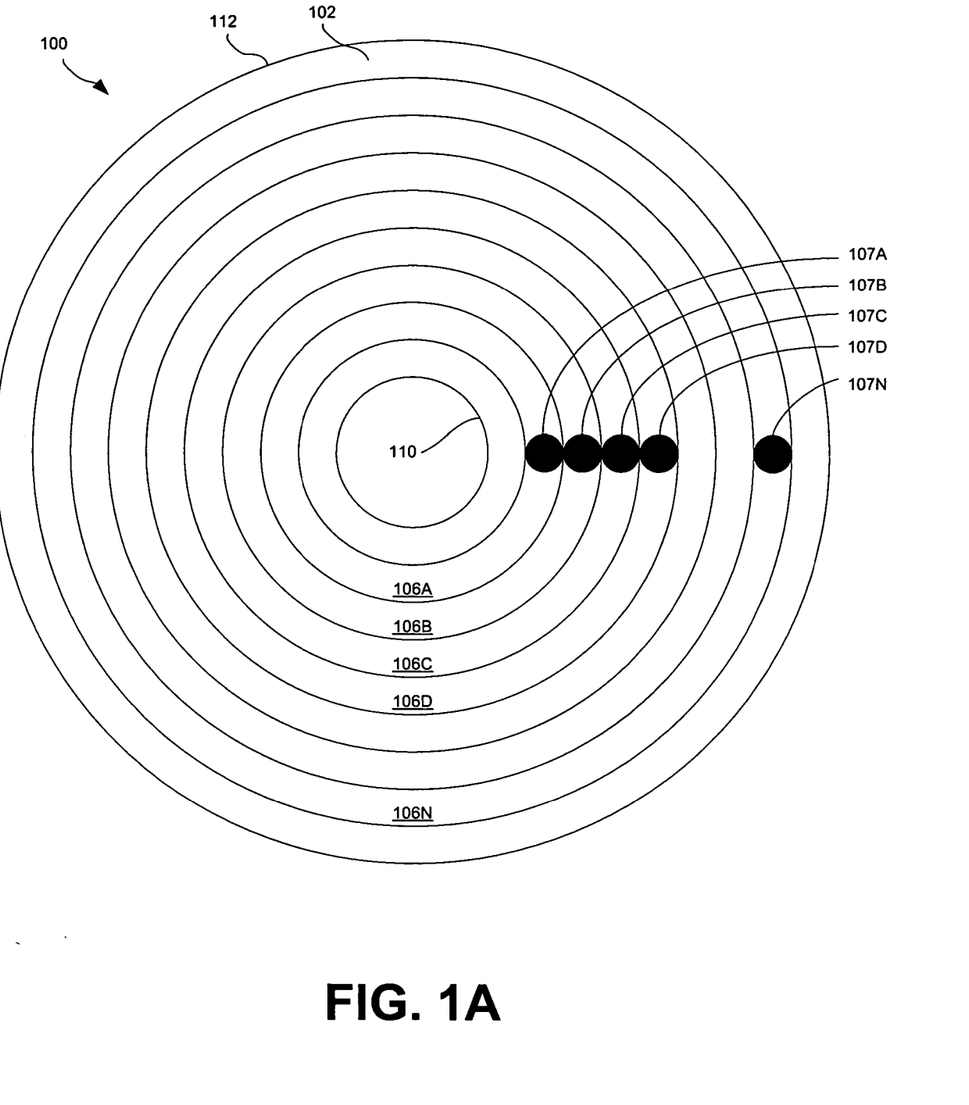
FIG. 1A is a diagram of an exemplary disc showing radially collinear track starting positions for use with an embodiment of the invention.

Referring to the drawings, in which like reference numerals indicate like elements, FIG. 1A illustrates a disc 100 as an exemplary medium for use with an embodiment of the invention. Examples of the disc 100 include CDs, DVDs, other types of optical discs, magnetic disc media, and any other writable media, including media adapted to receive ink (such as paper). Any writable media may be used with any appropriate technology for recording marks on the disc 100, and regardless of whether the markings are visible or invisible to the human eye.

The disc 100 has an inside edge 110 and an outside edge 112. Inside edge 110 in some embodiments surrounds a hole in the disc 100. However, on a disc 100 which has no hole, inside edge 110 may simply represent an inside boundary for an innermost track 106.

The disc 100 also has a writable label side 102, which is shown in FIG. 1A. An example of an optically writable label side 102 is particularly disclosed in the patent application of Anderson et al. entitled "Integrated CD/DVD Recording and Labeling," filed Oct. 11, 2001, and published on Jun. 12, 2003 as U.S. Pub. No. 2003/0108708 A1. In an embodiment of the invention, disc 100 also has a data side, not illustrated, on the opposite side of the disc 100 from the label side 102.

In an alternate embodiment of the invention, label side 102 comprises a medium adapted to receive a marking fluid such as ink. For example, label side 102 may be a coating disposed on a surface of a disc 100. Another example of label side 102 comprises paper, including conventional adhesive-backed paper for labeling. In some embodiments, disc 100 may be formed from paper having an adhesive side, not illustrated, on the opposite side of the disc 100 from the label side 102. The label side 102 has a number of concentric circular tracks 106A, 106B, 106C, 106D, ..., 106N, collectively referred to as the tracks 106. The tracks 106 are divided into marking locations, which may be uniformly spaced, referred to herein as pixels.

A marking mechanism comprising a printhead, such as a printhead used for inkjet printing and the like, may be adapted to move or advance radially, between inside edge 110 and outside edge 112. A printhead, such as an inkjet printhead, is typically adapted to print a plurality of pixels substantially simultaneously, resulting in tracks 106 each typically having a width of more than one pixel. A conventional optical marking mechanism is typically adapted to move in a similar fashion, but to mark one pixel at a time, resulting in tracks 106 each having a width of one pixel.

The marking mechanism may advance or move radially from any track 106 to another track 106, and may write marks to pixels of the tracks 106. The tracks 106A, 106B, 106C, 106D, ..., 106N have starting positions 107A, 107B, 107C, 107D, ..., 107N, respectively, the latter of which are collectively referred to as the starting positions 107. A process of writing, labeling, or marking may encompass the omission of marking blank pixels, as well as the act of marking non-blank pixels. Accordingly, a starting position 107 is the position at which the process begins, which is not necessarily the position at which a first non-blank mark is made. In other words, when writing begins at a starting position 107, the writing may in some embodiments start with one or more blank pixels.

One of ordinary skill in the art will recognize that the size of the tracks 106, the size of the pixels, and the size of the marks shown at starting positions 107 have been greatly exaggerated for illustrative clarity. Furthermore, the marks written to each pixel, including the pixels shown at starting positions 107, can be shapes other than circular, such as rectangular, elliptical, and so on, and such marks may be varied in size, color, shape, depth, density, or intensity. In some embodiments, a pixel may be formed from more than one mark. The variations in mark size, color, shape, depth, density, or intensity of the marks at a specific pixel may be determined by such factors as the number of marks placed at a marking location, the laser power used to make a mark, the depth at which the laser has been focused, and the like.

If the data for labeling is formatted relative to a fixed angular start position, the starting positions 107 are the first pixels on the tracks 106 to which the marking mechanism writes marks upon advancing to each track 106. For instance, in FIG. 1A, the starting positions 107 line up on a radial line from the inside edge 110 to the outside edge 112 of the disc 100. As a reference point, such a radial line represents an angle of zero degrees, and the starting positions 107 for track 106 are aligned on the zero degree angle in FIG. 1A.

Example of Track Shifting

Figure 1B:
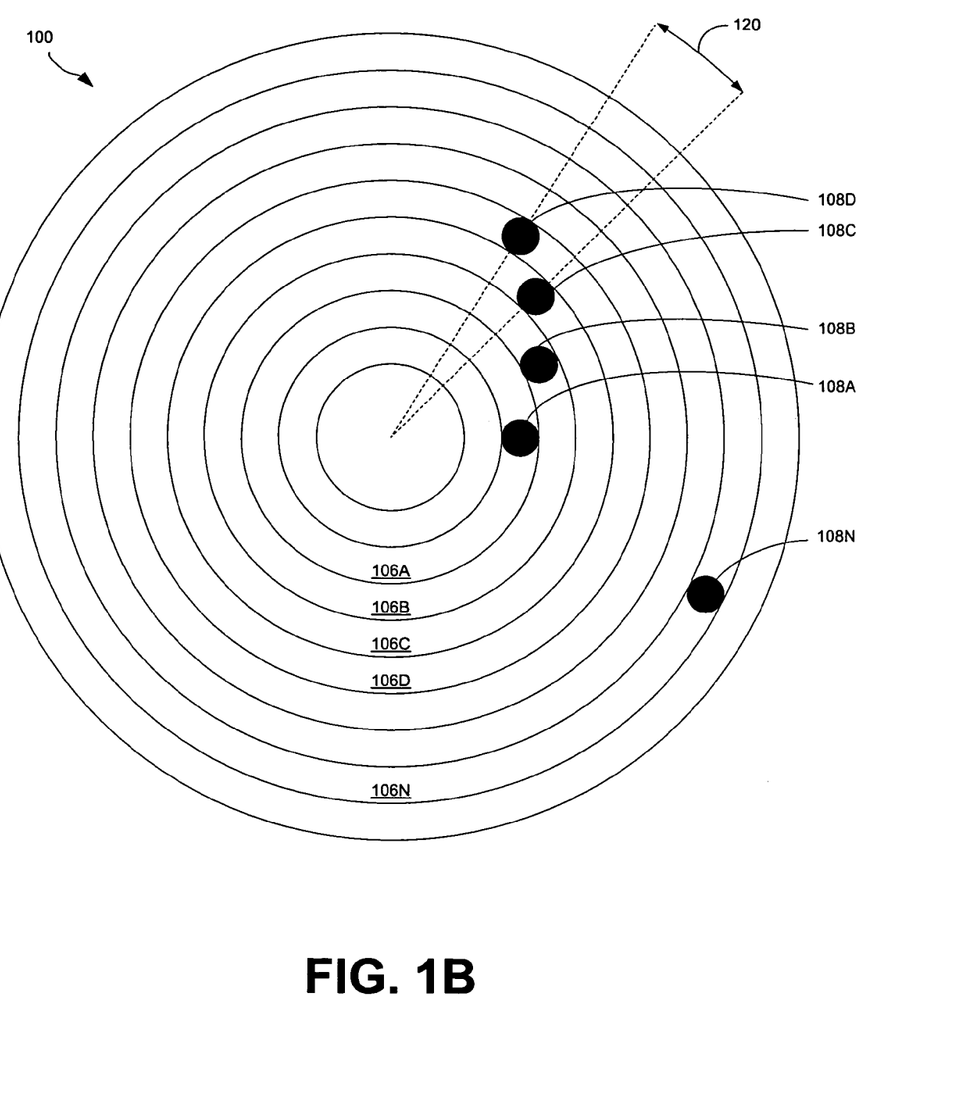
FIG. 1B is a diagram of an exemplary disc showing radially non-collinear track starting positions for use with an embodiment of the invention.

FIG. 1B illustrates starting positions 108A, 108B, 108C, 108D, . . . , 108N, collectively referred to as the starting positions 108, that are radially non-collinear with one another, and which may have a varying shift amount. A track shift amount may be measured between starting positions 108A and 108B, between starting positions 108B and 108C, and so forth for the remaining starting positions 108. Either a fixed shift amount or a variable shift amount may be used with embodiments of the present invention. The shift amount is an angular distance that may be expressed in any appropriate unit of measurement, such as a shift angle, a time duration, or a linear distance. An exemplary angular distance 120 is illustrated between starting positions 108C and 108D; however, one skilled in the art will recognize that an angular distance 120 between any two points on the disc 100 may readily be determined.

The angular distance 120 between the starting position 108A on track 106A and the starting position 108B on next track 106B may be based, at least in part, on the length of time needed to reposition and stabilize the marking mechanism when advancing from track 106A to track 106B, thus avoiding the waiting period that would otherwise be required for the disc 100 to complete a revolution and return to an angular position equal to that of starting position 108A.

An example of track shifting, suitable for use with embodiments of the present invention, is particularly disclosed by McClellan et al. in the co-pending patent application entitled "Multiple Passes Over Tracks Of And Radially Non-Collinear Track Starting Positions On Label Side Of Optical Disc," filed Apr. 23, 2003, and assigned Ser. No. 10/423,366.

Example of Marking Device

Figure 2:
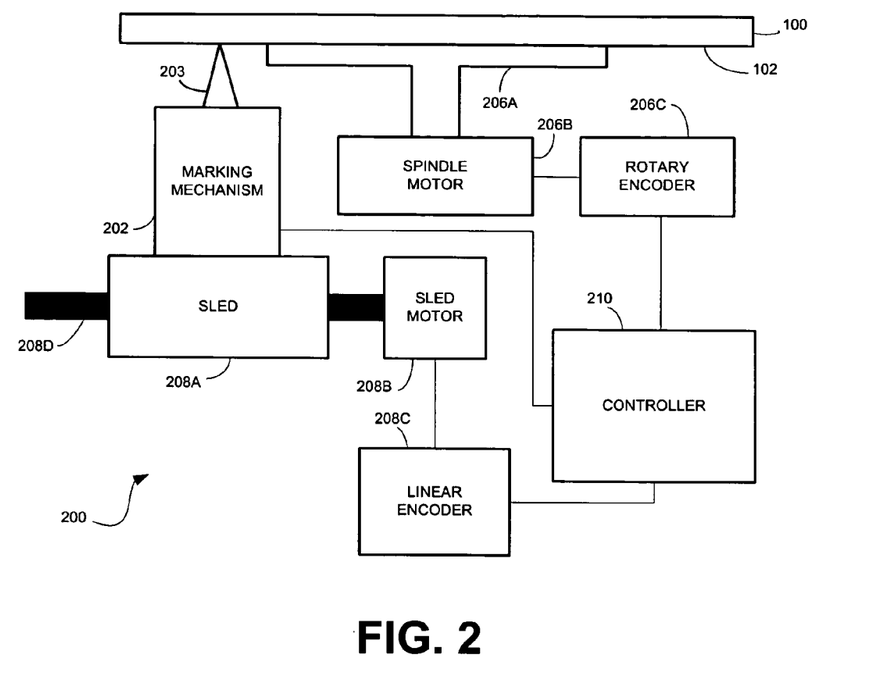
FIG. 2 is a diagram of an exemplary mass storage device according to an embodiment of the invention.

FIG. 2 depicts an exemplary device 200 according to an embodiment of the invention. The device 200 is for writing data to the disc 100, and may also be able to read data from the disc 100. The device 200 may, for example, be part of a data storage device or a labeling device, which in turn is connectable to a computer via an I/O channel.

More specifically, in an illustrative embodiment, the device 200 is a mass storage device for writing to, and in some embodiments reading from, an optically writable label side 102 of an optical disc 100. The mass storage device 200 includes a marking mechanism 202 for marking the label side 102 with a marker 203. In one embodiment, marker 203 is an optical beam such as a laser beam, and the marking mechanism 202 comprises a beam source and an objective lens for focusing the optical beam onto the label side 102, such as in a manner known to those of ordinary skill in the art.

In an alternative embodiment, the device 200 is a printing device for writing to a label side 102 of a disc 100. Marker 203 comprises ink, and the marking mechanism 202 comprises a printhead, such as an inkjet printhead for depositing ink on the label side 102, such as in a manner known to those of ordinary skill in the art.

The device 200 also includes a spindle 206A, a spindle motor 206B, and a rotary encoder 206C, which are collectively referred to as the spindle motor mechanism 206. The device 200 further includes a sled 208A, a sled motor 208B, a linear encoder 208C, and a rail 208D, which are collectively referred to as the sled motor mechanism 208. Finally, the device 200 includes a controller 210.

The spindle motor mechanism 206 rotates the disc 100. In particular, the disc 100 may be situated on the spindle 206A, which is rotated or moved by the spindle motor 206B to a given position specified by the rotary encoder 206C communicatively coupled to the spindle motor 206B. The sled motor mechanism 208 moves the marking mechanism 202 radially relative to the disc 100. In particular, the marking mechanism 202 is situated on the sled 208A, which is moved on the rail 208D by the sled motor 208B to a given position specified by the linear encoder 208C communicatively coupled to the sled motor 208B. The rotary encoder 206C and the linear encoder 208C may include hardware, software, or a combination of hardware and software.

The controller 210 controls the spindle motor mechanism 206 and the sled motor mechanism 208. By controlling the motor mechanisms 206, 208, the controller 210 is able to advance the marking mechanism 202 to desired positions on the tracks 106 such as starting positions 107, 108. The controller 210 similarly is able to cause the marking mechanism 202 to pass over the tracks 106, and to advance the marking mechanism 202 from one track 106 to another track 106. The controller 210 may be capable of determining and adjusting starting positions 108 on the tracks 106, as described in further detail below. A computer communicatively coupled to the controller 210 may similarly be capable of determining and adjusting starting positions 108 on the tracks 106. The device 200 may comprise firmware or other computer-readable media for storing instructions to the controller 210.

As will be appreciated by those of ordinary skill in the art, the components depicted in the device 200 are representative of an illustrative embodiment of the invention, and do not limit all embodiments of the invention.

Example of Data Representing a Track

Figure 3:
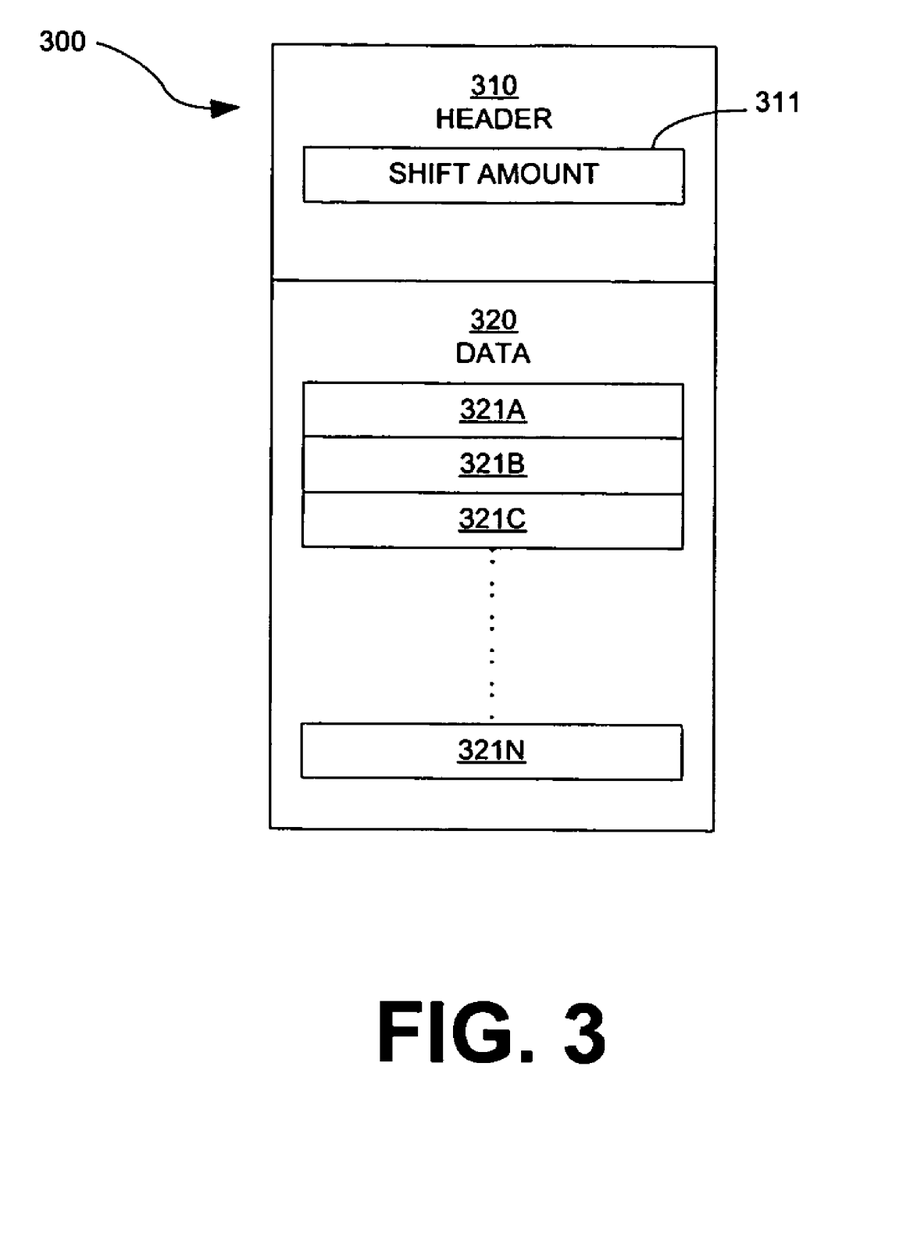
FIG. 3 is a diagram of a data packet for a track according to an embodiment of the invention.

FIG. 3 depicts an exemplary data packet 300 representing a track 106 according to an embodiment of the invention. The data packet 300 is a set of data comprising a header 310 and a data section 320.

The header 310 includes a numeric data element representing a shift amount 311. In one embodiment, the shift amount 311 represents the angular distance 120 from the previous track's starting position 108 to the current track's starting position 108. In other words, if data packet 300 represents track 106C, the shift amount 311 represents the angular distance 120 from starting position 108B to starting position 108C. In an alternative embodiment, the shift amount 311 represents the angular distance 120 from a zero-degree reference position to the starting position 108C of track 106C. In still another embodiment, the shift amount 311 represents the angular distance 120 from a last non-blank pixel of a previous track 106 to a starting position of the current track 106, or to a first non-blank pixel of the current track 106.

The shift amount 311 may be expressed in any appropriate unit or units of measurement from which an angular distance 120 may be determined. In an illustrative example, a shift amount 311 may be expressed as a linear distance along a track 106, which may readily be converted to an angular distance 120 for a known radius of a track 106. In a further example, a shift amount 311 may be given as a duration of time, which may be readily converted to an angular distance 120 for a known radius and velocity along a track 106.

In one embodiment, the shift amount 311 is expressed in counts, with four hundred counts representing a complete revolution. For example, 50 counts represents a 45-degree shift angle, 100 counts represents a 90-degree shift angle, and 200 counts represents a 180-degree shift angle. Accordingly, a shift amount 311 of four hundred counts, or any multiple thereof, represents one or more complete revolutions and is equivalent in track starting location to a shift angle of zero.

Header 310 may also include other descriptive and useful information concerning the data section 320, such as a track number, length of the track 106 in pixels, size of the data section 320 in bytes, and the like. As will be appreciated by one of ordinary skill in the art, the information contained in data packet 300 may be organized in numerous ways without departing from the spirit of the invention; for example, one header 310 may contain descriptive information applicable to a plurality of data sections 320.

Data section 320 includes data elements 321A, 321B, 321C, . . . , 321N, collectively referred to as the data elements 321. In one embodiment, each data element 321 represents a pixel, which may be blank or non-blank. Data elements 321 may contain additional information regarding pixels, including information such as size, color, shape, depth, density, intensity, and the like. Such additional information may also be included in header 310, or in a separate data packet 300 of information.

In one embodiment, shift amount 311 is the angular position where labeling of a track 106 begins. For each track 106, data element 321A represents the first pixel in the track, for labeling at starting position 108.

If desired, changes may be made to the shift amount 311, to reflect any desired change to the angular position of the starting position 108. For proper labeling alignment of the pixels to be maintained from track to track, such a change to the shift amount 311 requires a compensatory adjustment in the labeling order of the data elements 321 to be labeled. Accordingly, labeling may begin at any of the data elements 321, continue to the last data element 321N, wrap around to the beginning, and conclude at the data element prior to the first-labeled element. For example, if track labeling begins at element 321C, labeling may continue through data element 321N, wrapping around to the first data element 321A, and conclude by labeling data element 321B. In some embodiments, as explained in detail below, labeling may conclude at the last non-blank data element prior to the first-labeled element. One of ordinary skill in the art will recognize that the same result may be achieved by shifting the order of the data elements 321, so that the contents of data element 321C are moved to the first data element 321A, the contents of data element 321B are moved to element 321N, and an equivalent shift takes place for each data element 321. Shifts in the opposite direction may also occur, as appropriate.

Conversely, the ordering of the data elements 321 may be shifted if desired, and such a shift may be reflected in a compensatory change to the shift amount 311 and starting position 108. For example, if it is desired to begin labeling of track 106D with a first pixel represented by data element 321C rather than the pixel represented by data element 321A, the shift amount 311 must be adjusted to compensate for the angular distance 120 between the original starting position 108D (corresponding to the desired labeling position for data element 321A) and a new starting position 108D (corresponding to the desired labeling position for data element 321C).

In an embodiment of the invention where track 106 has a width of more than one pixel, each data element 321 represents a plurality of pixels for labeling at a selected angular position on the track 106, or at a selected radial location and position along the track 106. If all of the pixel data in data element 321 are blank, the entire data element 321 is deemed blank. If any of the pixel data in data element 321 are non-blank, the entire data element 321 is deemed non-blank.

Example 1 of Immediate Track Shift

Figure 4:
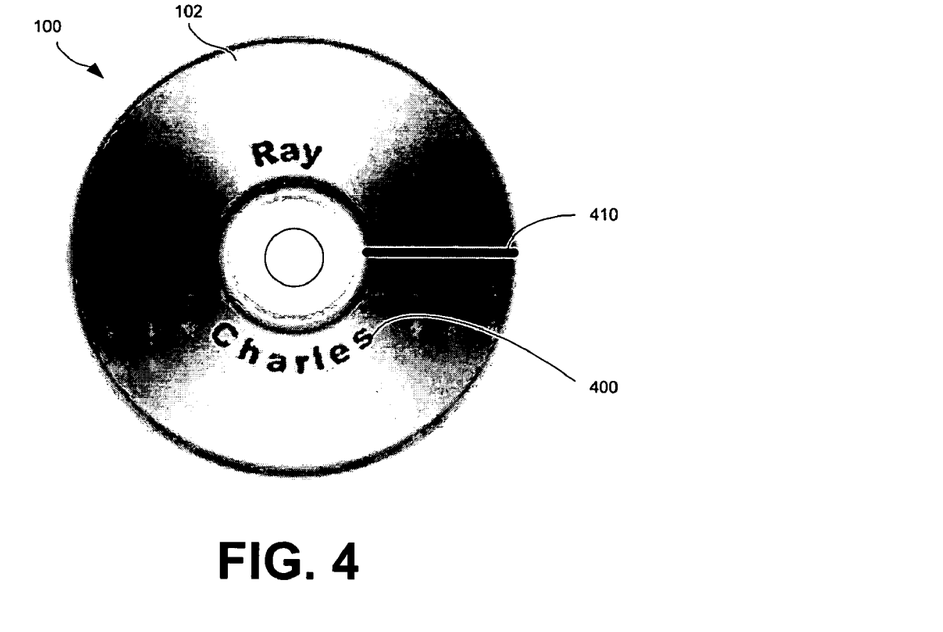
FIG. 4 is a diagram of an exemplary disc showing label data according to an embodiment of the invention.

FIG. 4 depicts a disc 100 displaying label information on a writable label side 102, according to an embodiment of the invention. The disc 100 has been labeled with image 400, corresponding to the exemplary text "Ray Charles" in the illustrated example. Image 400 may be any desired image, text, or combination thereof. Reference line 410 is a radial line representing a reference angle of zero degrees, and is not part of the visible image 400 to be labeled on the label side 102.

In an embodiment of the invention, labeling may start at a fixed angular position on the disc 100, which may fall within a blank area or a non-blank area of the image 400. With reference to FIG. 4, labeling of a first track 106 begins within a blank area of the image 400, at a fixed angular position represented by reference line 410. In an illustrative example, for a data packet 300 in which the data section 320 contains blank data prior to the first non-blank data, labeling starts at the fixed angular position when a zero shift amount 311 is specified for the first track 106. In an alternate example, by specifying a non-zero shift amount 311 for the first track 106, labeling may start at the angular position corresponding to the first non-blank data.

Prior to or during labeling of a track 106, according to an embodiment of the invention, the system looks ahead within the data packet 300 that corresponds to track 106, and detects the existence, if any, of one or more contiguous blank pixels at the conclusion of the track 106, thereby determining where the last non-blank pixel is located among the data elements 321. The conclusion of the track 106 ordinarily corresponds to the last data element 321N; however, the detection of blank pixels at the conclusion of the track 106 may take into account, as appropriate, any shifting, offset, or wraparound that may be applicable to the data elements 321, as has been described heretofore with reference to FIG. 3.

In some embodiments, if all of the pixels of the data packet 300 for labeling on track 106 are completely blank, the entire track 106 may be skipped. Otherwise, at least a portion of the track 106 is labeled, up to an ending position. The ending position is set to correspond to the last non-blank pixel. The ending position may be stored or maintained in any of numerous ways, as will be apparent to one of ordinary skill in the art. For example, the ending position may be variously represented by a numeric offset or index for the data elements 321, by a pointer to the last non-blank data element 321, by a shift amount 311 corresponding to the location of the last non-blank data element 321, and the like. The ending position may also be represented by an adjustment to information about the length of data section 320 or the number of data elements 321, which information may be stored in header 310 or elsewhere, effectively truncating the data elements 321 at the last non-blank pixel.

Once the last non-blank pixel is reached, a track shift occurs immediately, rather than waiting until the marking mechanism 202 returns to the starting position 108. In other words, at the ending position where there is no more non-blank data for the track 106 remaining to be labeled, the labeling of the remainder of the track 106 is skipped, and the marking mechanism 202 immediately begins to advance to a second track 106. Depending on the contents of the data packet 300, this may eliminate or reduce the time overhead associated with track shifting. Time may be saved by skipping the labeling of blank pixels, and the number of blank pixels at the conclusion of a track 106 may be proportionate to the time saving associated with skipping the labeling of the blank pixels. In some embodiments, the time saving may be at least equal to a time overhead for advancing the marking mechanism 202 to the second track 106. The second track 106 may be adjacent to the first track 106; however, if one or more intervening tracks 106 are completely blank, the intervening tracks 106 may be skipped in their entirety.

Figure 5:
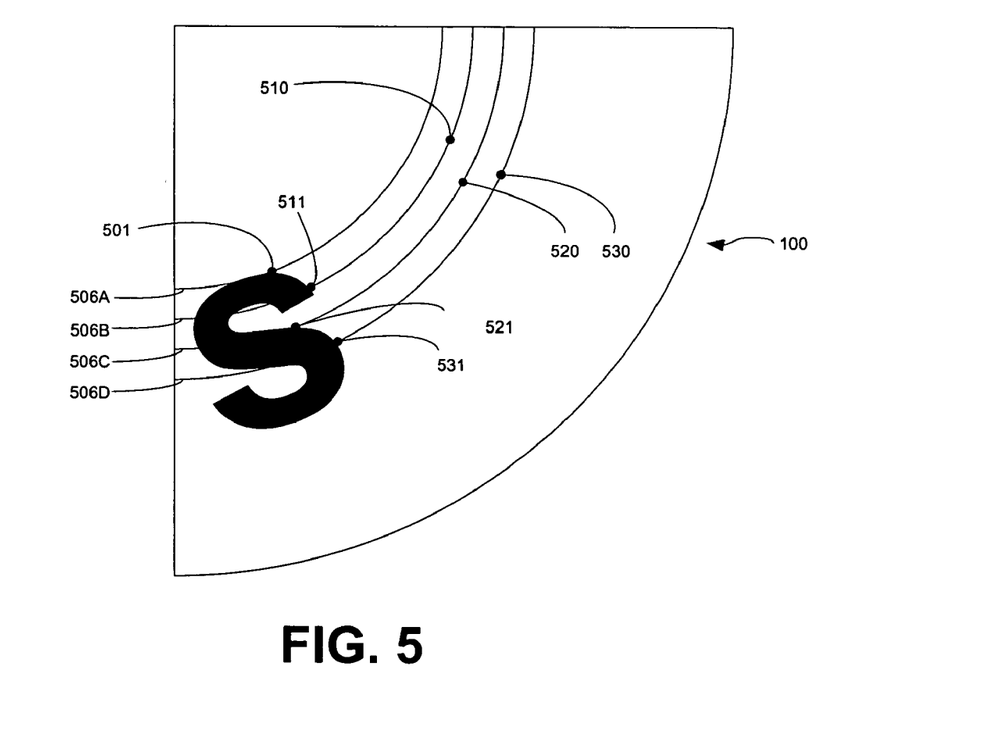
FIG. 5 is a diagram of a portion of an exemplary disc, for showing labeling which begins in a blank area, according to an embodiment of the invention.

FIG. 5 illustrates a portion of disc 100, showing an immediate track shift according to an embodiment of the invention. It will readily be understood that while the illustrated embodiment depicts counter-clockwise labeling, clockwise labeling may also be used. Further, while the illustrated embodiment depicts labeling of tracks 106 advancing in a direction moving outward from the center, the labeling of tracks 106 may in some embodiments advance in an opposite direction toward the center.

For illustrative purposes, the diagram of FIG. 5 aggregates numerous tracks 106 together into four representative illustrated tracks 506A, 506B, 506C, 506D. To simplify the discussion of these four representative tracks, it is assumed for purposes of this description that there are no intervening tracks 106 between the illustrated tracks. In other words, tracks 506A, 506B, 506C, 506D are adjacent to one another, and the illustrated spacing between the tracks is greatly exaggerated for illustrative clarity. One of ordinary skill in the art will further recognize that the size of the dots illustrating the starting positions 510, 520, 530 and ending positions 501, 511, 521, 531 have been greatly exaggerated for illustrative clarity.

A first track 506A has a starting position on the reference line 410 outside of the illustrated portion, and an ending position 501. A second track 506B has a starting position 510 and ending position 511. A third track 506C has a starting position 520 and ending position 521. A fourth track 506D has starting position 530 and ending position 531. As illustrated, a track 106 may begin with blank data immediately following the starting position, prior to the first non-blank data.

In the illustrated embodiment, an exemplary default fixed track shift of 36 degrees of rotation, equal to a shift amount 311 of forty counts, or ten percent (10%) of a complete revolution, is provided between each track 106 to accommodate the time overhead required for advancing the marking mechanism 202 to a second track 106. However, the actual value of the shift amount 311 may be determined in a variety of ways, which may include reference to numerous factors, including the radial location on the disc 100, and the time required for transferring data, for repositioning and stabilizing the marking mechanism 202, for any track data preparation, for skipping tracks, and the like.

In an alternative embodiment, the shift amount may be determined and specified based upon both the amount of time required to advance the marking mechanism in a radial direction to the next track 106 and the additional amount of time, if any, required for the disc 100 to rotate to a position where the marking mechanism is adjacent the first non-blank pixel in the next track 106. Once the shift is complete, the next track 106 immediately commences with marking, as the blank pixels at the beginning of the track 106 will have been skipped over. The device 200 or controller 210 thus knows the maximum possible shift amount between the last non-blank pixels in a first track 106 and the first non-blank pixel in the next track 106. The device 200 and controller 210 may be performing multiple activities during the shifting. Some such activities may be required for every shift (such as moving to the next track 106 and adjusting angular velocity) and some may be done periodically or intermittently (such as reacquiring or checking focus). The device 200 or controller 210 may assess whether there is enough "time" or "distance" to perform these other activities during this lull in marking. If the total lull between markings is denoted as the shift amount, then the device 200 and controller 210 can better assess whether this longer marking delay can be utilized to accomplish other activities.

The labeling of first track 506A begins at a fixed angular position within the image 400, at the reference line 410. Once labeling of the last pixel in the letter "s" for track 506A is completed, an embodiment of the invention looks ahead and sees that there are no more non-blank pixels to be labeled for that track 506A. All remaining pixels in the track 506A are blank. Therefore the last pixel in the letter "s" is the ending position 501 of track 506A.

Rather than labeling all of the remaining data elements 321 for track 506A, which are now determined to be blank pixels, the marking mechanism 202 instead immediately shifts to track 506B, which is the next track 106 outward. When the shift is completed, after a rotation of 36 degrees, the marking mechanism 202 is located at starting position 510 of track 506B. In the illustrated embodiment, the end points for tracks 506B, 506C, and 506D would parallel the curves of the letter "s."

At starting position 510, labeling begins for the second track 506B. Once the marking mechanism 202 completes the last non-blank pixel on the track 506B, the marking mechanism 202 is at ending position 511. The marking mechanism 202 can immediately shift outward to track 506C, which includes a rotation of 36 degrees, and leaves the marking mechanism 202 at starting position 520.

At starting position 520, labeling begins for track 506C. Once the marking mechanism 202 completes the last non-blank pixel of track 506C, the marking mechanism 202 is at ending position 521. The marking mechanism 202 can immediately shift outward to track 506D, which includes a rotation of 36 degrees, and leaves the marking mechanism 202 at starting position 530.

Thus, the labeling of each track 106, and associated track shifting, only takes one complete revolution of the disc 100, instead of a revolution plus an additional 36 degrees. In the illustrated example, skipping the blank pixels at the end of each track 106 saves an additional ten percent (10%) time overhead that the fixed track shift would have otherwise required.

A further advantage of some embodiments of the invention is a reduction in starting position pixel marking defects, and a concomitant reduction in visually discernible defects in the image 400. Starting position pixel marking defects may occur, for example, when a marking mechanism 202 has not completely finished stabilizing before reaching the starting position 108, which can result in a first-labeled pixel that is perceptibly too dark, too light, or mispositioned. Starting position pixel marking defects may also occur, for example, when controller 210 has failed to compensate for a speed error of spindle motor 206B, resulting in mark misplacements along a track 106. These mark misplacements may culminate with maximum misplacement of the last mark in the track 106. If the last pixel is a non-blank pixel and the first pixel is a non-blank pixel, the speed error may result in an unintentional blank gap between these pixels, or in overlapping of these pixels. Where the first-labeled pixel in a track 106 is blank, however, such defects can not be as easily discerned. Accordingly, in determining a desired shift amount, the controller 210 may deem it more desirable to assign a starting position 108 at a blank pixel of the track 106, rather than a non-blank pixel of the track 106. The controller 210 may also consider neighboring tracks 106, and may deem it still more desirable to assign a starting position 108 in a region of image 400 where pixels in neighboring tracks 106 are also blank. The controller 210 may take into account that starting position pixel marking defects are more likely to be noticeable to the human eye when the defects are clustered proximate one another, such as concentrated along a radial line. Accordingly, when defects are unavoidable, the controller 210 may deem it desirable to isolate or scatter the defects across an image 400. Fixed track shifting inherently results in the scattering of starting position pixel marking defects, because the starting positions 108 may be shifted by a fixed amount each time the labeling advances from a track 106 to a next track 106.

Example 2 of Immediate Track Shift

Figure 6:
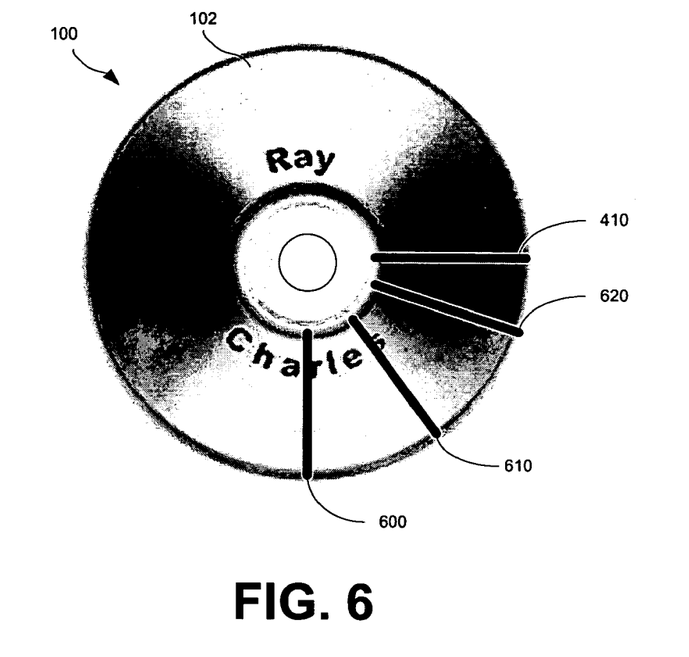
FIG. 6 is a diagram of an exemplary disc, for showing labeling which begins in a non-blank area, according to an embodiment of the invention.

FIG. 6 is a diagram of a disc 100 according to an embodiment of the invention, depicting the effects of immediate track shifting when the labeling begins in a non-blank area of the image 400. In the illustrated embodiment, an exemplary default fixed track shift of 36 degrees of rotation is provided between each track 106 to accommodate the time overhead required for advancing the marking mechanism 202 to a second track 106.

Labeling of track 506A begins at a starting position 108A, which is a fixed angular position represented by reference line 600. Labeling of the first track 506A requires a complete revolution of disc 100, returning back to the angular position where labeling of track 506A started, because the reference line 600 falls within the letter "r", and there are pixels of the letter "r" at the beginning and at the end of the track 506A. There are no non-blank pixels at the end of the track. The ending position of track 506A is the reference line 600. At the end of track 506A, the track is shifted by 36 degrees, which puts the starting position 108B for track 506B at the reference line 610. There was no time savings for the labeling of track 506A.

The labeling of track 506B requires a complete revolution back to the reference line 610, again because there are no non-blank pixels at the end of the track. The reference line 610 falls within the letter "s", and there are pixels of the letter "s" at the beginning and at the end of the track 506B. The ending position of track 506B is the reference line 610. At the end of track 506B, the track is shifted by 36 degrees, which puts the starting position 108C for track 506C at the reference line 620. There was no time savings for the labeling of track 506B.

The last non-blank pixel for track 506C, and for all subsequent tracks 106 in the lettered region of image 400, will fall along the edge of the letter "s". The blank pixels at the end of track 506C will be skipped, and the marking mechanism 202 can immediately advance outward to a next track. Starting positions for tracks subsequent to track 506C will be located within the blank region in the image 400 between the letter "s" and the letter "y". In the illustrated example using a fixed track shift of 36 degrees, the track labeling and shifting will only take one complete revolution from track 506C onward, instead of a revolution plus an additional 36 degrees. There will be time savings for the labeling of track 506C and additional tracks 106 beyond track 506C. The actual time savings is dependent in part upon the content of the image 400 and the amount of the default fixed track shift.

In addition, for those tracks 106 that start and end within a non-blank area of image 400, immediate track shifting results in the dispersal of any visibly discernible defects in image 400 which might result from the starting position pixel marking defects discussed above. Such defects, if any, are spread across the area of image 400, rather than being concentrated along a radial line, where they are more easily noticed. Thus, where there is substantially non-blank image 400 in the label, such as a solid fill area, immediate track shifting will tend to reduce discernible visible errors in a fashion similar to fixed track shifting, in that each starting position 108 will be shifted by a fixed angle from the previous track.

Example 3 of Immediate Track Shift

Figure 7:
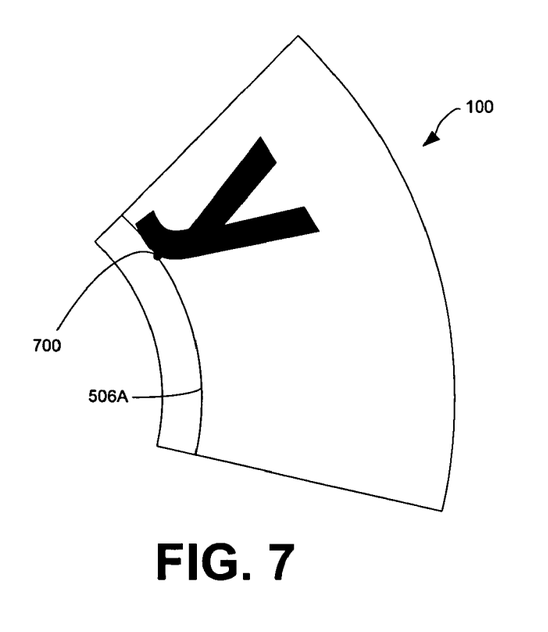
FIG. 7 is a diagram of a portion of an exemplary disc, showing a starting position for labeling according to an embodiment of the invention.

FIG. 7 illustrates a portion of disc 100 according to an embodiment of the invention, depicting an adjusted starting position 700.

An embodiment of the invention assesses the data packet 300 representing a first track 506A, which has an original starting position 108 at a fixed angular position relative to the disc 100, represented by reference line 410 (shown in FIG. 4). Upon detecting one or more contiguous blank pixels at the beginning of the data section 320, an adjusted starting position 700 for the track 106 is set at a first non-blank pixel, and labeling of the track 106 starts at the adjusted starting position 700.

An alternative embodiment of the invention determines, as explained below, adjusted starting position 700 to be the optimal starting point 108 for track 506A, rather than starting at a fixed angular position relative to the disc 100, such as the arbitrary fixed angular positions represented in the foregoing examples by reference lines 410 and 600, respectively. Assessing the data packet 300 for track 506A, an adjusted starting position 700 for the first track is determined such that a selected stream of one or more contiguous blank pixels will be shifted to the conclusion of the data section 320. Labeling of the track 506A then begins at the adjusted starting position 700. The blank pixels at the end of the data section 320 are skipped, with an immediate track shift occurring upon completion of the final non-blank pixel in track 506A. In one embodiment, the selected stream is the longest stream of contiguous blank pixels in the data section 320.

In the illustrated example, assessing the data packet 300 for track 506A, an embodiment of the invention determines that by starting at the right edge of the letter "y", there will be sufficient time and room, upon completion of the final pixel in the letter "s" at ending position 501 (shown in FIG. 5), to perform a track shift prior to a complete revolution. Once labeling of the last pixel in the letter "s" is completed, an embodiment of the invention looks ahead and sees that there are no more non-blank pixels to be labeled for track 506A. The labeling process continues as described in Example 2 above.

Methods

Figure 8:
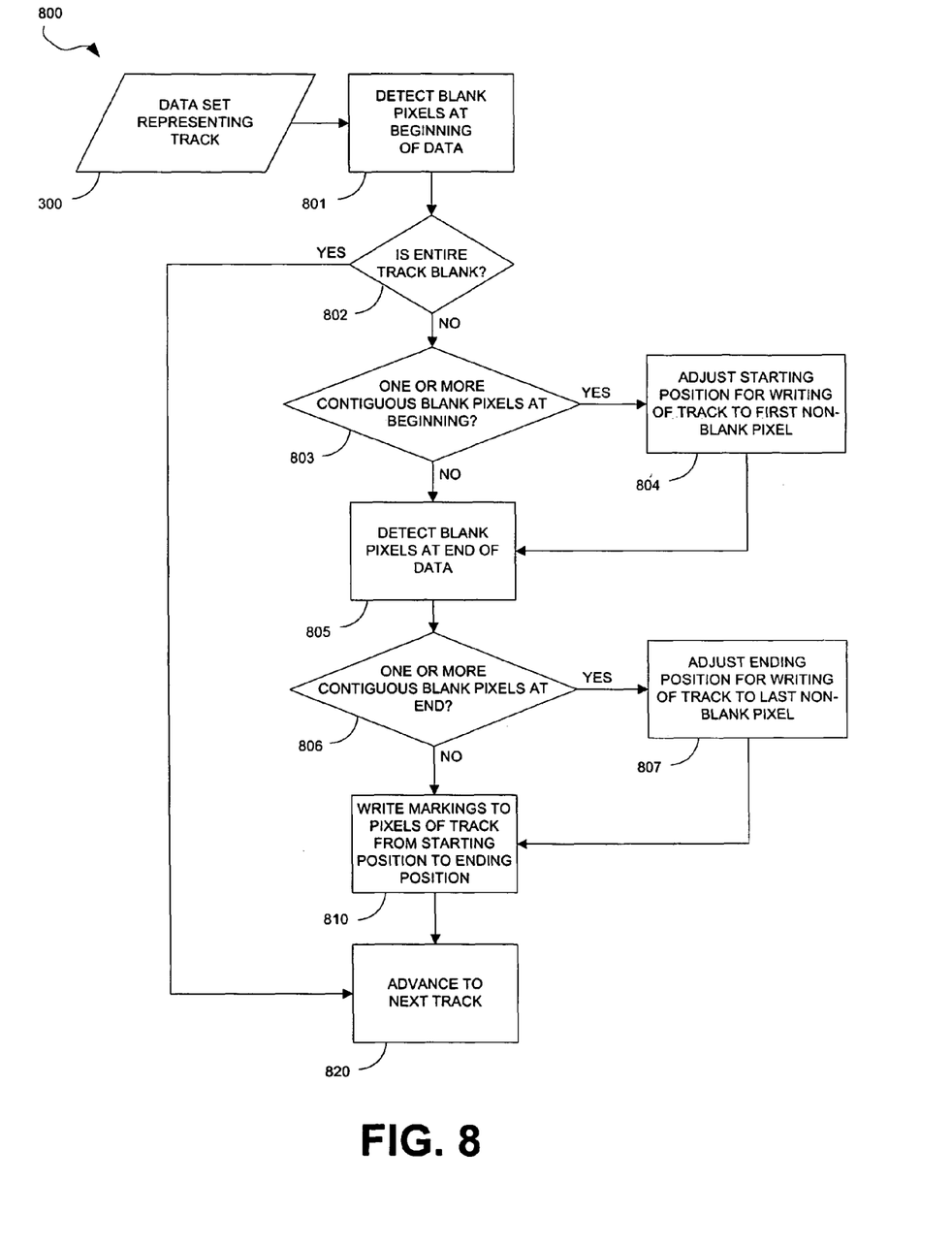
FIG. 8 is a flow chart illustrating a method for labeling a plurality of tracks according to an embodiment of the invention.

FIG. 8 shows a method 800 for labeling a plurality of tracks 106 on a medium, such as label side 102 of a disc 100, according to an embodiment of the invention. A device 200 may perform the method 800 in one embodiment of the invention. For instance, in a drive-based implementation of an embodiment of the invention, a mass storage device 200 for writing to label side 102 may include a controller 210 for performing the method 800, and the controller 210 may comprise a computer-readable storage medium, such as firmware, containing a set of software instructions to the controller 210. In a host-based implementation of an embodiment of the invention, a device 200 for writing to label side 102 may be networked or connected, including physically or wirelessly connected, to a host computer adapted to run software for performing the method 800.

First, a data packet 300 representing a first track 106 is provided. As is shown, assessment of the data packet 300 begins at block 801, where blank pixels, if any, are detected at the beginning of the data section 320. Next, at block 802, a check is performed to determine whether the data section 320 representing the entire track 106 consists entirely of blank pixels, such that the entire track 106 is blank. If the check at block 802 indicates that the entire track 106 is blank, the paradigm proceeds directly to block 820, where the marking mechanism 202 is advanced to a second track 106.

If the check at block 802 indicates that the entire track 106 is not blank, at block 803 a further check is performed to determine whether the data section 320 representing track 106 has one or more contiguous blank pixels at the beginning. If the check at block 803 indicates that there are no blank pixels at the beginning, the paradigm proceeds directly to block 805. If the check at block 803 indicates that there are one or more contiguous blank pixels at the beginning, the paradigm proceeds to block 804. At block 804, the starting position 108 for the writing of track 106 is adjusted to the first non-blank pixel, resulting in an adjusted starting position 700.

At block 805, blank pixels, if any, are detected at the end of the data section 320, taking into account any shifting or wraparound of data elements 321 that may have resulted from the adjustment of original starting position 108 to adjusted starting position 700. At block 806, a check is performed to determine whether the data section 320 representing track 106 has one or more contiguous blank pixels at the end. If the check at block 806 indicates that there are no blank pixels at the end, the paradigm proceeds directly to block 810. If the check at block 806 indicates that there are one or more contiguous blank pixels at the end, the paradigm proceeds to block 807. At block 807, the ending position for the writing of track 106 is adjusted to the last non-blank pixel.

At block 810, at least a portion of the track 106 is written, by marking the pixels of track 106 from the adjusted starting position 700 (or if no adjustment was made at block 804, from original starting position 108), up to the ending position, which may have been adjusted as determined in block 807.

Next, at block 820, the marking mechanism 202 is advanced to a second track 106. For example, the marking mechanism 202 may be advanced by sending a track-advance signal to the controller 210. This concludes the processing of the data packet 300 for the first track 106.

Figure 9:
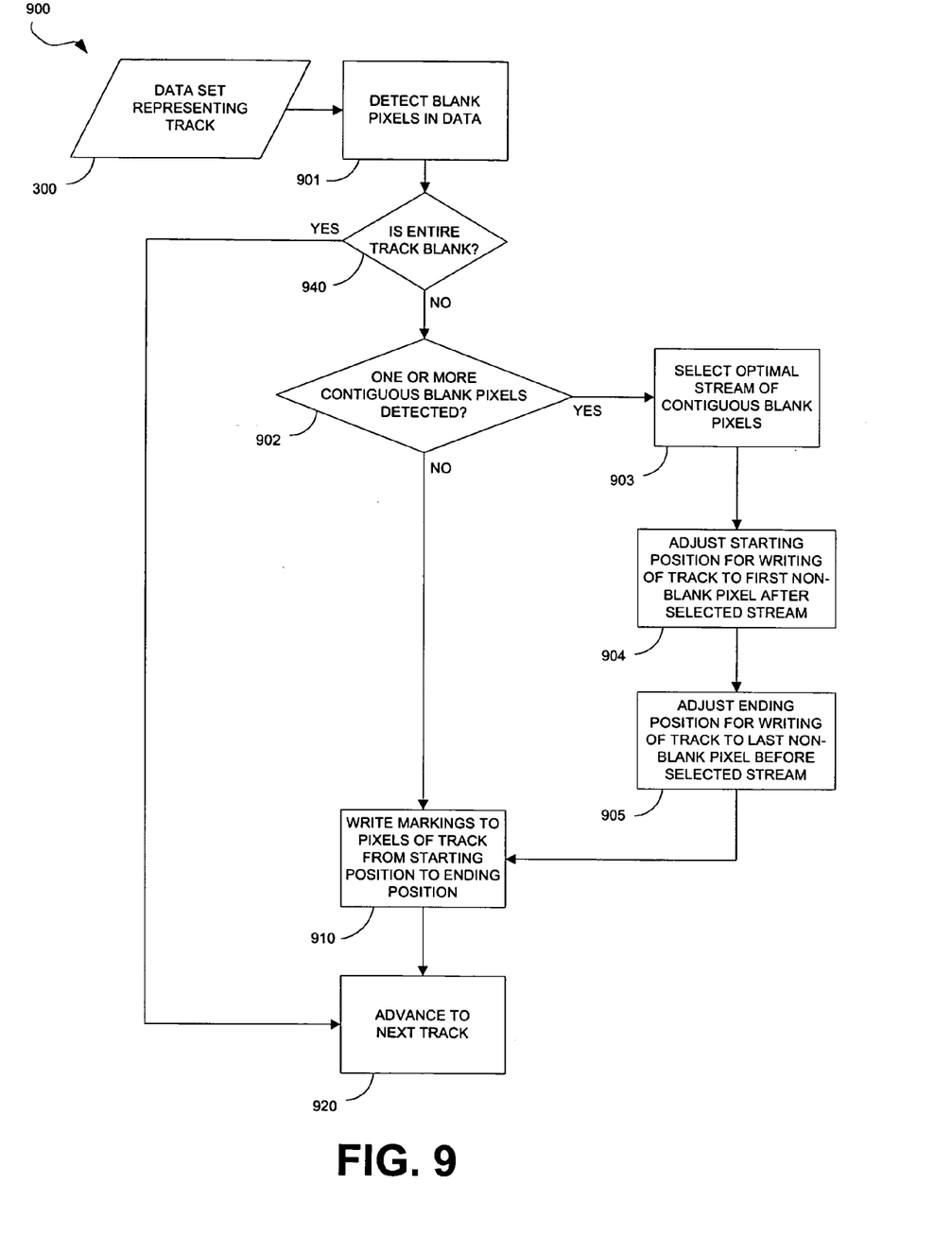
FIG. 9 is a flow chart illustrating a method for labeling a plurality of tracks according to an alternative embodiment of the invention.

FIG. 9 shows a method 900 for labeling a plurality of tracks 106 on a medium, such as label side 102 of a disc 100, according to an alternative embodiment of the invention. A device 200 may perform the method 900 in one embodiment of the invention, such as a drive-based implementation comprising a device 200 for writing to label side 102 which includes a controller 210 for performing the method 900, and software or firmware containing a set of instructions to the controller 210. A host computer may be adapted to run software for performing the method 900, such as in a host-based implementation of an embodiment of the invention, comprising a device 200 for writing to label side 102 which may be networked or connected, including physically or wirelessly connected, to the host computer.

First, a data packet 300 representing a first track 106 is provided. As is shown, assessment of the data packet 300 begins at block 901, where blank pixels, if any, are detected for the entire data section 320. Next, at block 940, a check is performed to determine whether the data section 320 representing the entire track 106 consists entirely of blank pixels, such that the entire track 106 is blank. If the check at block 940 indicates that the entire track 106 is blank, the paradigm proceeds directly to block 920, where the marking mechanism 202 is advanced to a second track 106.

If the check at block 940 indicates that the entire track 106 is not blank, at block 902 a further check is performed to determine whether the data section 320 representing track 106 has one or more contiguous blank pixels anywhere. If the check at block 902 indicates that the entire track 106 is non-blank, the paradigm proceeds directly to block 910, where at least a portion of the track 106 is written.

If the check at block 902 indicates that one or more streams of contiguous blank pixels exists anywhere in the track, the paradigm proceeds to block 903. At block 903, an optimal stream of contiguous blank pixels is selected from the one or more streams. The data for track 106 is assessed to determine an adjusted starting position 700 where there will ideally be sufficient time and room, upon completion of the final pixel in the track, to perform a track shift prior to a complete revolution. In one embodiment of the invention, the selected stream may be the longest stream of blank pixels. Additional factors may be taken into account for determining which stream is the optimal stream, which may include such factors as at least partial randomness, the contents of data packets 300 for adjacent tracks 106, reduction of discernible starting pixel marking defects, and the length of time needed for repositioning and stabilizing the labeling mechanism when advancing between tracks 106.

At block 904, the starting position 700 for writing of track 106 is adjusted to the first non-blank pixel after the selected stream. At block 905, the ending position for the writing of track 106 is adjusted to the last non-blank pixel before the selected stream. Next, the paradigm proceeds to block 910.

At block 910, at least a portion of the track 106 is written, by marking the pixels of track 106 from the adjusted starting position 700 (or if no adjustment was made at block 904, from original starting position 108), up to the ending position, which may have been adjusted as determined in block 905.

Next, at block 920, the marking mechanism 202 is advanced to a second track 106. For example, the marking mechanism 202 may be advanced by a track-advance signal sent from the controller 210 to the sled motor mechanism 208. This concludes the processing of the data packet 300 for the first track 106.

CONCLUSION

The medium for labeling, such as a disc 100 and label side 102, is depicted as circular in the drawings for the illustrated embodiments. However, the invention is not limited to a disc 100 comprising circular media or circular tracks 106. The plurality of tracks 106 may comprise concentric or non-concentric circles, ellipses, spirals, and the like, without departing from the spirit of the invention. Further, a disc 100 may comprise media having a wide variety of shapes, including CDs, DVDs, and other optical media having a rotatable surface in the shape of a business card or other planar figures such as a polygon, an ellipse, and the like.

Although an exemplary implementation of the invention has been described in detail above, those skilled in the art will readily appreciate that many additional modifications are possible in the exemplary embodiments without materially departing from the novel teachings and advantages of the invention. Accordingly, these and all such modifications are intended to be included within the scope of this invention. The invention may be better defined by the following exemplary claims.

What is claimed is:

1. A method for labeling a plurality of tracks on a medium comprising:
    detecting one or more contiguous blank pixels at the conclusion of a data set representing a first track,
    setting an ending position for the first track at a last non-blank pixel in the data set before the contiguous blank pixels,
    labeling at least a portion of the first track up to the ending position, and
    beginning to advance to a second track immediately after labeling the last non-blank pixel at the ending position.

2. The method of claim 1 further comprising:
    detecting one or more contiguous blank pixels at the beginning of the data set,
    setting a starting position for the first track at a first non-blank pixel, and
    starting the labeling at the starting position.

3. The method of claim 1 further comprising:
    determining a starting position for the first track such that a selected stream of one or more contiguous blank pixels is at the conclusion of the data set, and
    starting the labeling at the starting position.

4. The method of claim 3 wherein the selected stream is the longest stream of contiguous blank pixels in the data set.

5. The method of claim 3 further comprising skipping the selected stream, wherein a time saving associated with skipping the selected stream is at least equal to a time overhead for advancing to the second track.

6. The method of claim 1 further comprising:
    determining whether all pixels for the first track are blank, and
    if all pixels for the first track are blank, advancing to the second track without labeling.

7. The method of claim 1 wherein the medium is circular.

8. The method of claim 1 wherein the medium is an optical disc.

9. The method of claim 1 wherein the medium is a writable label side of an optical disc.

10. The method of claim 1 wherein the medium is a label for an optical disc.

11. The method of claim 1 wherein the second track is adjacent to the first track.

12. The method of claim 1 wherein the second track is concentric with the first track.

13. The method of claim 1 wherein the plurality of tracks is concentric.

14. The method of claim 1 wherein labeling comprises generating a beam for optically marking a surface of the medium with visible markings.

15. The method of claim 1 wherein labeling comprises depositing ink for marking a surface of the medium.

16. The method of claim 1 wherein at least one of the plurality of tracks has a width of one pixel.

17. The method of claim 1 wherein at least one of the plurality of tracks has a width of more than one pixel.

18. The method of claim 1 further comprising:
    detecting one or more contiguous blank pixels at the beginning of the first track,
    setting a starting position for the first track at a first non-blank pixel, and
    starting the labeling at the starting position.

19. The method of claim 1 further comprising adjusting a starting position by a desired shift amount.

20. The method of claim 19 further comprising determining the desired shift amount such that a starting position at a blank pixel of the track is selected.

21. The method of claim 19 further comprising determining the desired shift amount such that a starting position is selected wherein a neighboring pixel of a neighboring track is blank.

22. The method of claim 1 further comprising dispersing a plurality of starting pixel marking defects.

23. A medium comprising a plurality of tracks on a label side, the label side being markable according to a method comprising, for a track on the label side:
    detecting one or more contiguous blank pixels at the conclusion of a data set representing the track,
    setting an ending position for the track at a last non-blank pixel in the data set before the contiguous blank pixels,
    forming markings for at least a portion of the track up to the ending position, and
    beginning to advance to a second track immediately after marking the last non-blank pixel at the ending position.

24. The medium of claim 23 wherein the medium is an optical disc.

25. The medium of claim 23 wherein the label side is a writable label side of an optical disc.

26. The medium of claim 23 wherein the medium is a label for an optical disc.

27. The medium of claim 23, the method further comprising:
    detecting one or more contiguous blank pixels at the beginning of the data set,
    setting a starting position for the first track at a first non-blank pixel, and
    starting the forming at the starting position.

28. The medium of claim 27, the method further comprising:
    determining a starting position for the first track such that a selected stream of one or more contiguous blank pixels is at the conclusion of the data set, and
    starting the forming at the starting position.

29. The medium of claim 28 wherein the selected stream is the longest stream of contiguous blank pixels in the data set.

30. The medium of claim 28 further comprising a time saving associated with skipping the selected stream.

31. The medium of claim 23, the method further comprising:
    determining whether all pixels for the first track are blank, and
    if all pixels for the first track are blank, advancing to the second track without forming markings.

32. The medium of claim 23 wherein the label side is circular.

33. The medium of claim 23 wherein the second track is adjacent to the first track.

34. The medium of claim 23 wherein the second track is concentric with the first track.

35. The medium of claim 23 wherein the plurality of tracks is concentric.

36. The medium of claim 23, wherein forming markings comprises generating a beam for optically marking a surface of the medium.

37. The medium of claim 23, wherein forming markings comprises depositing ink for marking a surface of the medium.

38. The medium of claim 23 wherein each of the plurality of tracks has a width of one pixel.

39. The medium of claim 23 wherein each of the plurality of tracks has a width of more than one pixel.

40. The medium of claim 23, the method further comprising:
  detecting one or more contiguous blank pixels at the beginning of the first track,
  setting a start of the data set at a first non-blank pixel, and
  starting the labeling of the first track at a starting position.

41. The medium of claim 23, the method further comprising adjusting a starting position by a desired shift amount.

42. The medium of claim 41, the method further comprising determining the desired shift amount such that a starting position at a blank pixel of the track is selected.

43. The medium of claim 41, the method further comprising determining the desired shift amount such that a starting position is selected wherein a neighboring pixel of a neighboring track is blank.

44. The medium of claim 23, the method further comprising dispersing a plurality of starting pixel marking defects.

45. A mass storage device for writing on a label side of a medium a plurality of data sets, each data set representing a corresponding track on the label side, the device comprising:
  means for detecting one or more contiguous blank pixels in a data set of the plurality of data sets,
  means for setting an ending position for the corresponding track at a last non-blank pixel in the data set before the contiguous blank pixels,
  means for marking pixels on at least a portion of the corresponding track from a starting position to the ending position, and
  means for beginning to advance to a second track immediately after marking the last non-blank pixel at the ending position.

46. The mass storage device of claim 45 further comprising means for setting the starting position at a first non-blank pixel.

47. The mass storage device of claim 45 further comprising means for determining a starting position for the corresponding track such that a selected stream of one or more contiguous blank pixels is at the conclusion of the data set.

48. The mass storage device of claim 47 wherein the selected stream is the longest stream of contiguous blank pixels in the data set.

49. The mass storage device of claim 45 further comprising:
  means for determining whether all pixels for the corresponding track are blank, and
  means for advancing to the second track without marking pixels on the corresponding track.

50. The mass storage device of claim 45 wherein the medium is an optical disc.

51. The mass storage device of claim 45 wherein the label side is a writable label side of an optical disc.

52. The mass storage device of claim 45 wherein the means for marking pixels comprises means for generating a beam for optically marking the label side.

53. The mass storage device of claim 45 wherein the means for marking pixels comprises means for depositing ink for marking the label side.

54. A method for producing a marking device, the method comprising:
  providing a marking mechanism that is able to at least write markings on a plurality of tracks of a label side of a disc,
  providing a controller that is able to position the marking mechanism in response to a plurality of data sets, each data set representing a corresponding track,
  the controller further being able to detect one or more contiguous blank pixels in a data set, set an ending position for the corresponding track at a last non-blank pixel in the data set before the contiguous blank pixels, cause the marking mechanism to mark pixels on at least a portion of the corresponding track from a starting position to the ending position, and cause the marking mechanism to begin to advance to a second track immediately after marking the last non-blank pixel at the ending position.

55. The method of claim 54 wherein the marking mechanism comprises a beam source and an objective lens.

56. The method of claim 54 wherein the marking mechanism comprises a printhead.

57. A computer-readable storage medium containing a set of instructions for a controller that is able to position a marking mechanism for writing markings on a plurality of tracks of a writable label side of an optical disc, the set of instructions comprising steps for:
  (a) receiving one or more data sets, each data set representing a corresponding track,
  (h) detecting one or more contiguous blank pixels in a data set of the one or more data sets,
  (c) setting an ending position for the corresponding track at a last non-blank pixel in the data set before the contiguous blank pixels,
  (d) causing the marking mechanism to mark pixels on at least a portion of the corresponding track from a starting position to the ending position, and
  (e) causing the marking mechanism to begin to advance to a second track immediately after marking the last non-blank pixel at the ending position.

58. The computer-readable storage medium of claim 57, the set of instructions further comprising a step for setting the starting position for the corresponding track at a first non-blank pixel.

59. The computer-readable storage medium of claim 57, the set of instructions further comprising a step for determining a starting position for the corresponding track such that a selected stream of one or more contiguous blank pixels is at the conclusion of the data set.

60. The computer-readable storage medium of claim 59, wherein the selected stream is the longest stream of contiguous blank pixels in the data set.

61. The computer-readable storage medium of claim 59, the set of instructions further comprising a step for skipping the selected stream, wherein a time saving associated with skipping the selected stream is at least equal to a time overhead for causing the marking mechanism to advance to the second track.

62. The computer-readable storage medium of claim 57, the set of instructions further comprising steps for:
  (a) determining whether all pixels for the corresponding track are blank, and
  (b) causing the marking mechanism to advance to a second track without labeling the corresponding track, if all pixels for the corresponding track are blank.

63. The computer-readable storage medium of claim 57 wherein the set of instructions are stored in firmware.

64. The computer-readable storage medium of claim 57 wherein the data set comprises:
- one or more data elements each corresponding to one or more pixels for writing to the corresponding track, and
- a header comprising shift information.

65. The computer-readable storage medium of claim 64 wherein the shift information represents an angular distance from a starting position for a previous track to a starting position for the corresponding track.

66. The computer-readable storage medium of claim 64 wherein the shift information represents an angular distance from a reference position to a starting position of the corresponding track.

67. The computer-readable storage medium of claim 64 wherein the shift information represents a distance from an ending data element for a previous track to a first data element of the track.

68. The computer-readable storage medium of claim 64 wherein the shift information represents a distance from an ending position for a previous track to a starting position for the track.

69. The computer-readable storage medium of claim 64, the set of instructions further comprising a step for adjusting the starting position by a desired shift amount.

70. The computer-readable storage medium of claim 69, the set of instructions further comprising a step for determining the desired shift amount such that the starting position at a blank pixel of the track is selected.

71. The computer-readable storage medium of claim 69, the set of instructions further comprising a step for determining the desired shift amount such that the starting position is selected wherein a neighboring pixel of a neighboring track is blank.

72. The computer-readable storage medium of claim 64, the set of instructions further comprising a step for dispersing a plurality of starting pixel marking defects.

73. The computer-readable storage medium of claim 57 wherein the one or more data sets comprise:
- a first data element,
- a last data element,
- a selected data element representing at least a starting pixel at the starting position from which writing continues to the last data element and wraps around to the first data element, and
- an ending data element preceding the selected data element, the ending data element representing at least an ending pixel at the ending position.

74. The mass storage device of claim 45, wherein the data set includes a plurality of streams of one or more contiguous blank pixels, the device further comprising:
- means for selecting an optimal one of the streams, and
- wherein the setting means sets the ending position for the corresponding track at the last non-blank pixel of the data set before the optimal stream.

75. The mass storage device of claim 74, wherein the optimal stream is the longest stream of contiguous blank pixels in the data set.

76. The mass storage device of claim 74, wherein the optimal stream is determined at least in part by the data sets for tracks adjacent to the corresponding track.

77. The mass storage device of claim 74, wherein the optimal stream is determined at least in part based on reduction of pixel marking defects.

78. The mass storage device of claim 74, wherein the optimal stream is determined at least in part based on a settling time of the marking means when advancing to the second track.

79. The computer-readable storage medium of claim 57, wherein the data set includes a plurality of streams of one or more contiguous blank pixels, the set of instructions further comprising a step for:
- selecting an optimal one of the streams, and
- wherein the setting step sets the ending position for the corresponding track at the last non-blank pixel of the data set before the optimal stream.

80. The mass storage device of claim 74, wherein the optimal stream is determined at least in part by the data sets for tracks adjacent to the corresponding track, at least in part based on reduction of pixel marking defects, and at least in part based on a settling time of the marking means when advancing to the second track.

* * * * *